(12) United States Patent
Schroeder

(10) Patent No.: US 6,236,183 B1
(45) Date of Patent: May 22, 2001

(54) DEVICE FOR SENSING THE ANGULAR POSITION FOR CONTROLLING A SYNCHRONOUS MOTOR EXCITED BY A PERMANENT MAGNET

(75) Inventor: Ulrich Schroeder, Mont Saint Aignan (FR)

(73) Assignee: Societe de Mecanique Magnetique, Saint Marcel (FR)

( * ) Notice: Subject to any disclaimer, the term of this patent is extended or adjusted under 35 U.S.C. 154(b) by 0 days.

(21) Appl. No.: 09/254,004

(22) PCT Filed: Sep. 10, 1997

(86) PCT No.: PCT/FR97/01593

§ 371 Date: Mar. 1, 1999

§ 102(e) Date: Mar. 1, 1999

(87) PCT Pub. No.: WO98/11662

PCT Pub. Date: Mar. 19, 1998

(30) Foreign Application Priority Data

Sep. 10, 1996 (FR) .................................................... 96 11015

(51) Int. Cl.[7] .................................................... H02P 6/18
(52) U.S. Cl. ................................................ 318/721; 318/439
(58) Field of Search ..................................... 318/138, 254, 318/439, 700, 720, 721, 722, 723, 724

(56) References Cited

U.S. PATENT DOCUMENTS

| 4,764,711 | 8/1988 | Deller . | |
|---|---|---|---|
| 4,814,677 | * 3/1989 | Plunkett | 318/254 |
| 5,140,243 | 8/1992 | Lyons et al. . | |
| 5,233,275 | 8/1993 | Danino . | |
| 5,367,234 | 11/1994 | Ditucci . | |
| 5,818,192 | * 10/1998 | Nozari | 318/609 |
| 6,005,364 | * 12/1999 | Acarnley | 318/632 |

FOREIGN PATENT DOCUMENTS 0 481 933   4/1992 (EP) .

* cited by examiner

Primary Examiner—Bentsu Ro
(74) Attorney, Agent, or Firm—McDermott, Will & Emery

(57) ABSTRACT

A device for detecting angular position for controlling a synchronous motor with permanent magnet excitation. The detector device comprises a calculation circuit (40) having measurement means (41) for measuring the voltage $V_u$ of a given phase U, first subtracter means (44) for subtracting from the voltage $V_u$ as determined by the measurement means (41) a magnitude (C1) corresponding to the resistive voltage drop across the resistance ($R_m$) of the winding under consideration carrying a current $i_u$, integrator means (42) for integrating the signal from the first subtracter means (44), second subtracter means (47) for subtracting from the signal delivered by the integrator means (42) a magnitude (C2) corresponding to the inductive voltage drop across the inductance ($L_m$) of the winding under consideration carrying the current $i_u$, and a comparator circuit (43) for detecting the zero crossings of the rotor flux sinewave signal as delivered by the second subtracter means (47) and thus for supplying an information signal identifying the angular position of the rotor relative to the stator. The angular position detector device avoids any need to make use of sensors of the Hall effect type or of the inductive type.

10 Claims, 3 Drawing Sheets

DEVICE FOR SENSING THE ANGULAR POSITION FOR CONTROLLING A SYNCHRONOUS MOTOR EXCITED BY A PERMANENT MAGNET

The present invention relates to an angular position detector device for controlling a synchronous motor with permanent magnet excitation, the motor having a rotor without a damping cage, a stator provided with a set of windings, a frequency converter, and circuits for controlling the frequency converter.

Synchronous motors with permanent magnetic excitation are being used more and more in high speed applications such as molecular drag pumps, high speed spindles, and air compressors, where high-speed applications require, amongst other things, high power density per unit volume and low rotor losses.

To vary the speed of a synchronous motor with permanent magnet excitation, it is generally necessary to use a frequency converter (an inverter). The converter applies current that is variable both in amplitude and in frequency to the motor windings. Control is normally performed in a "closed" loop: an angular position sensor provides information about the real position of the rotor to the converter which then applies currents of appropriate phase and amplitude to the stator of the motor. As a result the motor is constrained to rotate in synchronous manner and a damping cage (which would give rise to additional rotor losses) is unnecessary.

Speed is generally regulated by means of two servo-control loops in cascade: an internal current loop servo-controls the currents in amplitude and in phase, thus making them proportional to motor torque, while a second loop servo-controls the speed of rotation. The outlet from the speed regulator is the reference value for the current regulator.

The power stage of the converter is generally constituted by a bridge comprising six electronic switches powered by a DC source and subjected to on/off control at high frequency using the pulse width modulation (PWM) technique.

Converter-and-motor assemblies of the above-described type require the use of Hall effect sensors, inductive sensors, resolvers, or optical sensors (absolute or incremental) for control purposes.

The present invention seeks to avoid the need to use one or more angular position detectors, and in particular it seeks to avoid using active Hall effect sensors which provide an on/off signal in static operation, but which are fragile and lack reliability, while posing problems of withstanding radiation, and to avoid using the use of "revolution pulse" type inductive sensors which provide one pulse per revolution, but which require angular position adjustment that can be difficult and expensive to achieve in practice, given that inspection can be performed only while rotating.

The present invention also seeks to make it possible to have angular position information available that is analogous to that which could be obtained using an inductive "revolution pulse" type sensor or using a Hall effect sensor, but without implementing sensors of those kinds.

According to the invention, those objects are achieved by an angular position detector device for controlling a synchronous motor with permanent magnet excitation, the motor having a rotor without a damping cage, a stator provided with a set of windings, a frequency converter, and circuits for controlling the frequency converter, the device being characterized in that it comprises a calculation circuit having measurement means for determining the voltage $V_u$ of a given phase U, first subtracter means for subtracting from the voltage $V_u$ as determined by said measurement means, a magnitude corresponding to the resistive voltage drop across the resistance of the winding under consideration carrying a current $i_u$, integrator means for integrating the signal from the first subtracter means, second subtracter means for subtracting from the signal delivered by the integrator means a magnitude corresponding to the inductive voltage drop across the inductance of the winding under consideration carrying the current $i_u$, and a comparator circuit for detecting the zero crossings of the rotor flux sinewave signal delivered by the second subtracter means, thereby delivering an information signal identifying the angular position of the rotor relative to the stator.

The device includes means for taking information concerning the magnitude of the current $i_u$ carried by the winding under consideration from the outlet of the converter or from the stator terminals of the motor.

The calculation circuit is essentially made from a small number of operational amplifiers.

According to the invention, the angular position of the rotor is thus identified by making use solely of the voltage and current information that is always available at the outlet from the converter or at the terminals of the motor itself, without it being necessary to implement special sensors for detecting angular position.

The calculation circuit enables a plurality of output signals to be delivered that are at phase offsets of 120 degrees.

The calculation circuit makes it possible to obtain a rotor flux signal which is the image of the flux generated by the rotor magnets and which presents phase and amplitude that are not disturbed by the action of the converter.

The detector device of the invention can be applied to an electric motor driving a rotary assembly mounted on active magnetic bearings.

When the active magnetic bearings are fitted with a system for automatically controlling unbalance, the information signal identifying the angular position of the rotor can be applied to said system for automatically controlling the unbalance of the active magnetic bearings.

The device of the invention can be applied to the electric motor of a molecular drag pump, of a compressor, or of a tool-carrying spindle rotating at speeds of the order of several tens of thousands of revolutions per minute (rpm).

In a particular aspect of the present invention, the detector device includes means for providing open loop control of the frequency converter on starting, and then for switching over from open loop control to closed loop control when said signal providing information about the angular position of the rotor is provided in stable manner by said calculation circuit.

Other characteristics and advantages of the invention appear from the following description of particular embodiments given as examples with reference to the accompanying drawings, in which.

Figure 1:
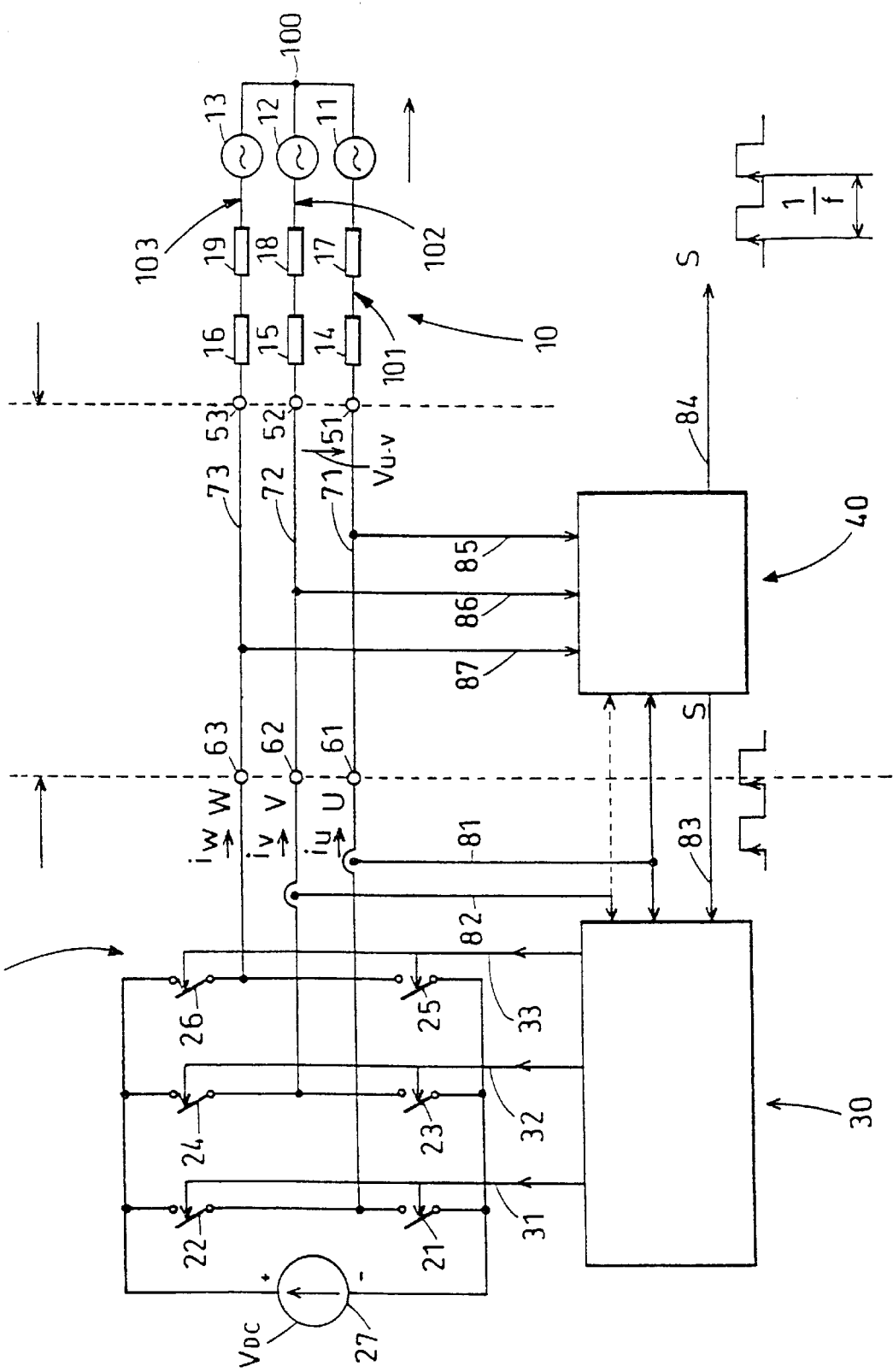
FIG. 1 is an overall circuit diagram of the main components of a synchronous motor with permanent magnet excitation to which the detector device of the invention is applied.

In FIG. 1, the stator 10 of a synchronous motor having permanent magnet excitation is represented diagrammatically as having windings 101, 102, and 103 corresponding to phases U, V, and W which are connected between a common point 100 and respective terminals 51, 52, and 53.

In operation, each winding 101, 102, 103 of each phase U, V, and W can be represented by an electromotive force 11, 12, and 13 corresponding to the unloaded induced voltage, by a resistance 14, 15, and 16, and by an inductance 17, 18, and 19.

The terminals 51, 52, and 53 of the stator 10 are connected via links 71, 72, and 73 to outlet terminals 61, 62, and 63 of a frequency converter 20 or inverter.

The frequency converter 20 is associated with a converter control circuit 30. The power stage of the converter 20 comprises a bridge having six electronic switches 21 to 26 powered by a DC source 27 $V_{DC}$. The switches 21 to 26 are controlled from the control circuit 30 by control wires 31 to 33. The switches are subjected to on/off control at a high frequency of the order of 10 KHz to 100 KHz by using the pulse width modulation technique. As a result, voltage "blocks" of amplitude equal to $+V_{DC}$ or to $-V_{DC}$ appear across the terminals of the stator 10.

The stator currents $i_u$, $i_v$, and $i_w$ can be subjected to sinewave modulation or to rectangular modulation. Sinewave modulation is more complicated in signal processing terms, but it contributes to improving the performance of the motor insofar as rotor heating is reduced and rotation is of better quality. Rectangular modulation is simpler to implement and is used in particular in low power motors (motors of the "brushless" type).

Traditionally, the combination of a synchronous motor with permanent magnet excitation and a converter makes use of one or more angular position sensors which, depending on the application, can be of the Hall effect sensor type, of the inductive sensor type, of the resolver type, or of the optical sensor type.

With molecular drag pumps and compressors in which low performance is acceptable at low speed and in which the torque to be supplied on starting is low, it is possible to start the system under open loop control. Under such circumstances, and in conventional manner, a single sensor such as an inductive sensor of the "revolution pulse" type is used which provides one pulse per revolution. When using such an inductive sensor, switchover from open loop control to closed loop control should be performed only once the signal from the sensor has become stable, which in practice means for frequencies that are greater than about 10 Hz to 20 Hz.

For optimum control of the motor, the relationship of the phase of the signal from the inductive sensor relative to the poles of the magnets on the rotor of the synchronous motor is of great importance. Adjusting the angular position relative to the magnet is difficult to perform and turns out to be expensive. As shown in FIG. 1, the detector device of the invention makes it possible to avoid the drawbacks associated with using one or more angular position detectors that are difficult to set up properly.

The detector device of the invention essentially comprises a calculation circuit 40 which receives via lines 85, 86, and 87, voltage information of the kind that is always available on the outlet terminals 61, 62, and 63 of the converter 20 or on the inlet terminals 51, 52, and 53 of the stator 10 of the motor.

Similarly, information $i_u$ and $i_v$ concerning the currents flowing through the windings 101 and 102 is taken from the converter 20 by lines 81 and 82 and is applied both to the calculation circuit 40 and to the converter control circuit 30.

As explained below with reference to FIGS. 2 to 5, the calculation circuit 40 can deliver a signal to the converter control circuit 30 via a line 83 without making use of a sensor that is difficult to set up properly, which signal includes positive fronts giving the angular position of the rotor relative to the stator.

The calculation circuit 40 can also supply a speed signal on a line 84, which signal delivers one pulse per revolution to control an automatic unbalance control system associated with active magnetic bearings supporting a rotary assembly driven by the synchronous motor. So far as the speed signal delivered over the line 84 is concerned, the phase relationship of the signal applied to the automatic unbalance controlling system relative to the angular position of the rotor of the motor is of no importance, unlike the signal delivered on the line 83 for controlling the converter 20 via the control circuit 30.

When a synchronous motor with permanent magnet excitation is caused to rotate unloaded, an alternating voltage can be measured across its terminals, which voltage is referred to as the "unloaded induced voltage". The amplitude of the unloaded induced voltage is proportional to speed of rotation, and for a two-pole motor, its frequency corresponds to the frequency of rotation.

Integrating this voltage by means of an electronic integrator gives a "rotor flux" signal that is the image of the flux generated by the rotor magnets. The amplitude of this flux signal is constant and its phase contains information about the angular position of the rotor relative to the stator.

Nevertheless, this flux signal as obtained by integrating the voltage across the terminals of the motor is highly deformed when the converter applies voltage in blocks to cause current to flow through the winding. Two magnetic fluxes are then superposed in the air gap: the flux that comes from the magnets; and the flux that is generated by the currents flowing in the windings of the stator.

The calculation circuit 40 which enables the rotor flux signal to be generated compensates for the disturbing effect of the flux generated by the winding and serves to obtain a flux signal whose phase and amplitude are practically undisturbed by the action of the converter 20. The rotor flux signal can thus be used in reliable manner to generate angular position signals or speed signals as delivered on the lines 83 and 84.

An embodiment of the calculation circuit 40 is described below with reference to FIGS. 2 to 5.

Figure 2:
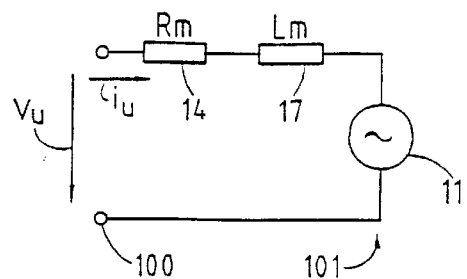
FIG. 2 is the equivalent circuit for one phase (phase U) of the FIG. 1 motor.

FIG. 2 is the equivalent circuit of a winding 101 corresponding to phase U of the motor. The unloaded induced voltage $Vi_u$, symbolized by the emf 11, is obtained by subtracting from the measured phase voltage $V_u$ the term $(i_u \times R_m)$ which represents the voltage drop across the resistance 14 of the winding 101 plus the associated cable, which resistance is of value $R_m$, and also subtracting the term ($L_m \times di_u/dt$) which represents the voltage drop across the inductance 17 of the winding 101, where the inductance has the value $L_m$. The first term is proportional to the resistance $R_m$ multiplied by the current $i_u$ as measured in the phase U, and the second term is proportional to the inductance $L_m$ multiplied by the derivative $di_u/dt$ of the current $i_u$ in the phase U.

From the equivalent circuit of FIG. 2, it is possible to write the following equations:

$$Vi_u = V_u - R_m i_u - L_m \frac{di_u}{dt} \quad (1)$$

$$\Phi_u = \frac{1}{T_i} \int Vi_u \quad (2)$$

where $\Phi_u$ represents the rotor excitation flux obtained after integrating the unloaded induced voltage $Vi_u$ and where $T_i$ is a constant.

Figure 3:
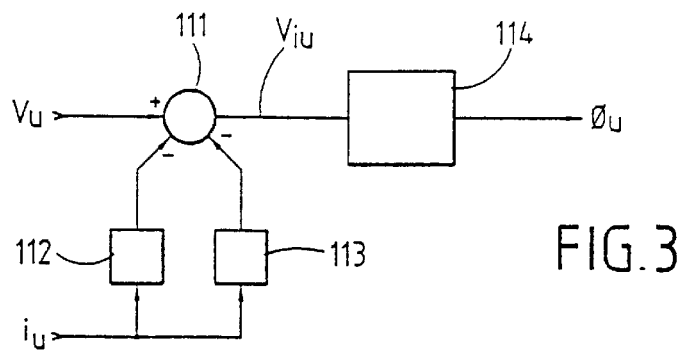
FIGS. 3 and 4 are two block diagrams of circuits for obtaining rotor excitation flux signals from the voltage and current information available at the terminals of the FIG. 1 motor.

FIG. 3 is a block diagram for generating in the calculation circuit 40 the rotor excitation flux signal $\Phi_u$ from the voltage information $V_u$ and the current information $i_u$ corresponding to the phase U and applied to the calculation circuit 40 by the lines 85 and 81 (FIG. 1).

In the block diagram of FIG. 3, a subtracter 111 receives the voltage signal $V_u$ and subtracts the terms $R_m \times i_u$ and $L_m \times di_u/dt$ as generated in circuits 112 and 113 from the current $i_u$ therefrom.

The signal $Vi_u$ from the subtracter 111 is integrated in the integrator circuit 114 to deliver the excitation flux signal $\Phi_u$.

The diagram of FIG. 3 nevertheless suffers from the drawback of requiring differentiation to be performed within the circuit 113, which makes implementation more difficult.

Figure 4:
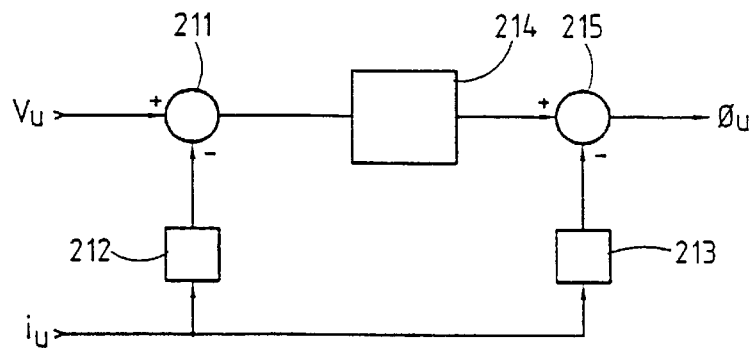

FIG. 4 is the block diagram of another implementation but does not require differentiation.

In this case, the first term $C_1 = R_m \times i_u$ is generated in a circuit 212 to be subtracted on its own from the voltage signal $V_u$ in a subtracter 211. The output signal from the subtracter 211 is subjected to integration in an integrator 214 and the effect of the inductive voltage drop is compensated at the outlet from the integrator circuit 214 by generating a second term $C_2 = (L_m/T_i) \times i_u$ in a circuit 213 which does not need to perform differentiation, and the second term $C_2$ is merely subtracted, by means of a second subtracter 215, from the signal delivered by the integrator circuit 214.

The diagram of FIG. 4 thus makes it possible to obtain an excitation flux signal $\Phi_u$ by making use only of subtractions and an integration, without any need also to perform differentiation which is always relatively difficult to achieve in practice.

Figure 5:
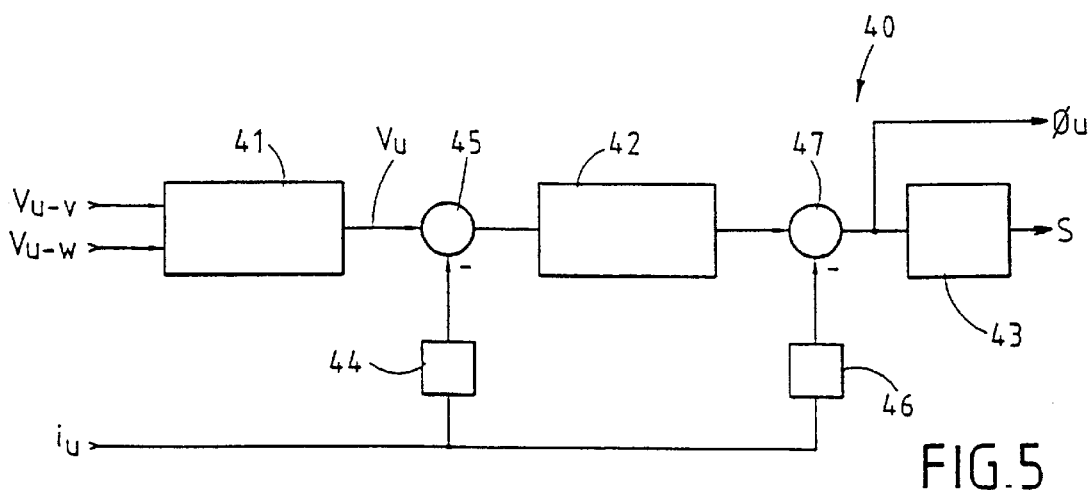
FIG. 5 is a block diagram showing all of the circuits constituting a calculation circuit in a detector device of the invention.

FIG. 5 shows the complete block diagram of a preferred implementation of the calculation circuit 40 on the same principles as the diagram of FIG. 4.

The calculation circuit 40 comprises a first circuit 41 which determines the voltage of the corresponding phase U from the voltages $V_{u-v}$ and $V_{u-w}$ which can be obtained between the wires 85 and 86 and between the wires 85 and 87. The voltage $V_u$ is thus equal to one-third of the sum of the voltages $V_{u-v}$ and $V_{u-w}$. The voltage signal $V_u$ from the circuit 41 is applied to a first subtracter 45 which subtracts the resistive voltage drop in the winding 101 (first term $C_1$ generated in a circuit 44). The signal from the subtracter 45 is integrated in an integrator circuit 42. The output signal from the integrator circuit 42 is itself applied to one of the inputs of a second subtracter 47 which subtracts therefrom a second term $C_2$ generated in a circuit 46 to take account of the inductive voltage drop in the winding 101. The rotor flux signal $\Phi_u$ is thus obtained at the output from the second subtracter 47.

The circuits 44 and 46 receive the current information $i_u$ as applied to the calculation circuit 40 by the line 81.

The flux signal $\Phi_u$ is also applied to a comparator 43 which detects the zero crossings in this sinewave signal $\Phi_u$. The positive fronts of the on/off signal output by the comparator 43 contain the angular position of the rotor relative to the stator and constitute angular position signals S delivered on the lines 83 and 84 of FIG. 1.

The calculation circuit 40 can be made very simply from a small number of low cost operational amplifiers. The information concerning the currents $I_u$, $I_v$, and $I_w$ is itself available in the converter 20, and the information concerning the voltages $V_u$, $V_v$, and $V_w$ of the phases U, V, and W can easily be obtained from voltage signals available at the terminals 51, 52, and 53 of the motor.

The integrator circuit 42 can be constituted by a simple first order filter having a cutoff at about 1 Hz. This avoids any zero offset problem.

The calculation circuit 40 can thus be integrated in the assembly constituted by the frequency converter 20 and its control circuit 30.

The detector device of the invention requires simple connections, only three power wires 85, 86, and 87 being required to supply the voltage information. The absence of a sensor of the Hall effect type or of the inductive type avoids problems associated with initial positioning and increases reliability. In the detector device of the invention, only the order of the phases relative to the direction of rotation is important.

The detector device of the invention is applicable in particular to synchronous motors with permanent magnet excitation as used in applications requiring a high speed of rotation and also requiring high power per unit volume and low rotor losses, for example: molecular drag pumps (300 W to 800 W, 20,000 rpm to 60,000 rpm); high speed tool-carrying spindles (15 kW to 45 kW, 15,000 rpm to 45,000 rpm); and air compressors (30 kW to 500 kW, 40,000 rpm to 75,000 rpm).

When the rotary assembly driven by the synchronous motor is mounted on active magnetic bearings, the detector device of the invention makes it possible to provide the automatic system for controlling unbalance with a stable speed signal from speeds of a few hertz upwards.

The invention thus makes it possible, once the frequency has reached a few hertz, both to provide closed loop control of the frequency converter 20 which is initially subjected to open loop control on starting, and control for the automatic system for controlling unbalance in the active magnetic bearing, while, in both functions, avoiding making any use of independent inductive sensors or the like for delivering information about angular position, and while keeping intact the performance of the assembly comprising the converter 20 and the motor 10.

Figure 6:
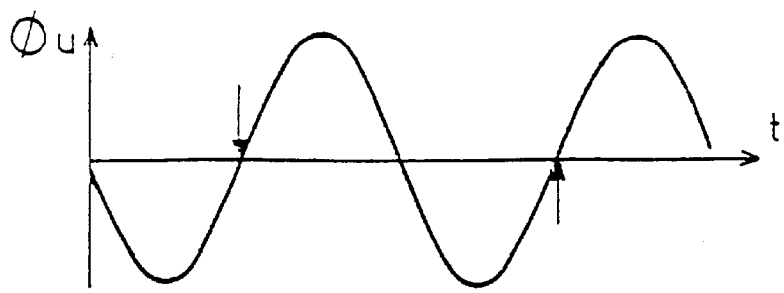
FIG. 6 is a waveform diagram of the flux signal obtained using a detector device of the invention when a motor is in a waiting state with zero motor current.
Figure 7:
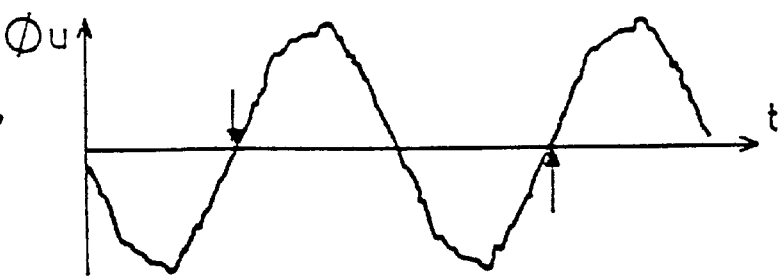
FIG. 7 is a waveform diagram of the flux signal obtained with a detector device of the invention when a motor is carrying maximum motor current.
Figure 8:
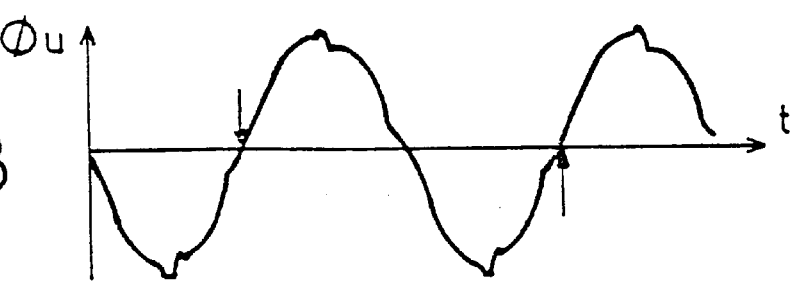
FIG. 8 is a waveform diagram showing the flux signal obtained with a detector device of the invention when a motor is operating as a generator with maximum motor current of sign opposite to that of the corresponding motor current shown in FIG. 7.

For a motor having a speed of rotation of about 24,000 rpm, FIGS. 6, 7, and 8 show the waveform of the rotor flux $\Phi_u$ obtained by calculation using the device of the invention, respectively when the motor is in a standby state, with zero motor current, when the motor is operating with maximum motor current, and when the motor is operating as a generator with maximum current but of sign opposite to the sign of the current during normal motor operation.

Figure 9:
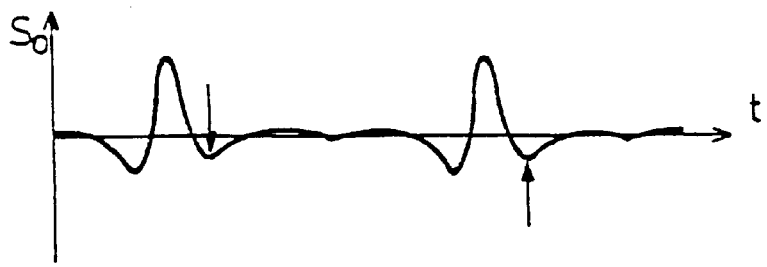
FIG. 9 is a diagram of an angular position signal obtained with a speed reference pulse device.

By way of comparison, FIG. 9 shows the waveform of a reference pulse signal as obtained from a conventional angular position detector.

It can be observed that the device of the invention for controlling a synchronous motor without a sensor triggers a zero crossing pulse (symbolized by the small arrows in the diagrams) for the sinewave flux signal on each period thereof and that the location of said pulses is unaffected by the load on the motor since whatever the current flowing in the winding of the stator 10 (FIG. 6), whether the motor is operating as a motor (FIG. 7) or as a generator (FIG. 8), the zero crossing remains accurately in the same phase as a reference "revolution pulse" of the kind that would be obtained from a conventional sensor (FIG. 9). The information obtained from the pulses of the device of the invention (FIGS. 6 to 8) can thus be considered as being of excellent quality even though no independent sensor is used, and use is made solely of information that is available at the phase terminals 51 to 53 of the motor stator 10.

What is claimed is:

1. An angular position detector device for controlling a synchronous motor with permanent magnet excitation, the motor having a rotor without a damping cage, a stator provided with a set of windings, a frequency converter, and circuits, for controlling the frequency converter, the device being characterized in that it comprises a calculation circuit having measurement means for determining the voltage $V_u$ of a given phase U, first subtracter means for subtracting from the voltage $V_u$ as determined by said measurement means, a magnitude corresponding to the resistive voltage drop across the resistance of the winding under consideration carrying a current $i_u$, integrator means for integrating the signal from the first subtracter means, second subtracter means for subtracting from the signal delivered by the integrator means a magnitude corresponding to the inductive voltage drop across the inductance of the winding under consideration carrying the current $i_u$, and a comparator circuit for detecting the zero crossings of the rotor flux sinewave signal delivered by the second subtracter means, thereby delivering an information signal identifying the angular position of the rotor relative to the stator.

2. A detector device according to claim 1, characterized in that it includes means for taking information concerning the magnitude of the current $i_u$ carried by the winding under consideration from the outlet of the converter or from the stator terminals (10) of the motor.

3. A detector device according to claim 1, characterized in that the calculation circuit is essentially made from a small number of operational amplifiers.

4. A detector device according to claim 1, characterized in that the integrator means comprise a first order filter with a cutoff of about 1 Hz.

5. A detector device according to claim 1, characterized in that the calculation circuit enables a plurality of output signals to be delivered that are at phase offsets of 120 degrees.

6. A detector device according to claim 1, characterized in that the calculation circuit is integrated in the circuits for controlling the frequency converter.

7. A detector device according to claim 1, characterized in that it is applied to the electric motor driving a rotary assembly mounted on active magnetic bearings.

8. A detector device according to claim 7, characterized in that the active magnetic bearings are fitted with an automatic unbalance control system, and in that the information signal identifying the angular position of the rotor is applied to the automatic unbalance control system of the active magnetic bearings.

9. A detector device according to claim 1, characterized in that it is applied to the electric motor of a molecular drag pump, of a compressor, or of a tool-carrying spindle rotating at speeds of the order of tens of thousands of revolutions per minute.

10. A detector device according to claim 1, characterized in that it includes means for providing open loop control of the frequency converter on starting, and then for switching over from open loop control to closed loop control when said signal providing information about the angular position of the rotor is provided in stable manner by said calculation circuit.

* * * * *